United States Patent [19]
Caruso

[11] 3,754,144
[45] Aug. 21, 1973

[54] IMAGE CONVERTER CHANGING INFORMATION OF ONE FREQUENCY TO ANOTHER FREQUENCY

[75] Inventor: Paul J. Caruso, Bedford, Mass.

[73] Assignee: Itek Corporation, Lexington, Mass.

[22] Filed: July 16, 1971

[21] Appl. No.: 163,549

[52] U.S. Cl. .............. 250/213 R, 250/225, 350/150
[51] Int. Cl. ............................................ H01l 17/00
[58] Field of Search ...................... 250/225, 213 R; 350/150; 340/173 PP

[56] References Cited
UNITED STATES PATENTS

| | | | |
|---|---|---|---|
| 3,566,130 | 2/1971 | Aldreich et al. ................. | 250/213 R |
| 3,449,583 | 6/1969 | Eden ................................ | 250/225 X |
| 3,517,206 | 6/1970 | Oliver ............................... | 250/225 |
| 3,475,736 | 10/1969 | Kurtz .............................. | 350/150 X |

OTHER PUBLICATIONS
Kazan: IBM Tech. Discl. Bulletin; Vol. 12, No. 6; 11/69 pp. 864, 865.

*Primary Examiner*—Walter Stolwein
*Attorney*—Homer O. Blair, Robert L. Nathans et al.

[57] ABSTRACT

Apparatus is disclosed for reading out information present in the form of variations in intensity of an electric field, including an electro-optic birefringent medium, whose birefringence varies as a function of an applied electric field, associated wth the electric field, means for directing polarized radiation through the electro-optic birefringent medium, means for reflecting the polarized radiation back through the electro-optic birefringent medium, and means for detecting the modulation representative of the information present in the electric field imposed upon the radiation by the birefringence of the electro-optic medium.

10 Claims, 3 Drawing Figures

Patented Aug. 21, 1973

3,754,144

PAUL J. CARUSO
INVENTOR.

BY Joseph S. Iandiorio

ATTORNEY.

IMAGE CONVERTER CHANGING INFORMATION OF ONE FREQUENCY TO ANOTHER FREQUENCY

CHARACTERIZATION OF INVENTION

The invention is characterized in a technique of reading information present in the form of variations in intensity of an electric field, including associating an electro-optic birefringent medium whose birefringence varies as a function of an applied electric field with the electric field varying the information, directing polarized radiation through the electro-optic birefringent medium, reflecting the polarized radiation back through the electro-optic medium, and detecting the modulation representative of the information present in the electric field imposed on the radiation by the birefringence of the electro-optic medium.

FIELD OF INVENTION

This invention relates to a technique of reading out information present in the form of variations in intensity of an electric field using an electro-optic birefringent medium, and more particularly to such a technique in which the read out radiation is passed through and reflected back through the electro-optic medium and to such a technique which is well suited for operation as an image converter.

BACKGROUND OF INVENTION

Conventional image converters, especially those using electronic converter tubes, are generally large, delicate, bulky and require high driving voltages necessitating large power supplies. Such converters also may provide relatively poor contrast and low resolution. The brightness of the image produced by these devices is limited to that obtainable from the luminescent phosphor screens and the frequency of the readout radiation is likewise limited to the frequencies obtainable from the phosphor. This latter limitation similarly limits the color of the image produced by the phosphor. Because electronic image converters must first convert input radiation to an electron beam and the electron beam into output radiation they require three focusing systems: one to focus the input radiation on the converter tube, a second to focus the electron beam on the phosphor screen and a third to focus the output radiation for viewing by the human eye or other observer.

SUMMARY OF INVENTION

It is therefore an object of this invention to provide a small, compact, rugged, simple image converting and intensifying device requiring only small low voltage power supplies and capable of providing an image of good contrast and resolution over a wide range of brightness and frequency.

The invention may be accomplished in an image converter apparatus for receiving information contained in the pattern of radiation in a first frequency range and converting it to a similar pattern of radiation in a second frequency range. In applications where the image converter is used only to effect an increase in brightness in the image, the second frequency and the first frequency may in fact be the same frequency. There is a photoconductor medium and means for providing a pattern of information in the first frequency range to the photoconductor medium. An electro-optic birefringent medium whose birefringence varies as a function of the intensity of an applied electric field, is associated with the photoconductor medium and there are means for applying an electric field to the photoconductor medium and electro-optic medium. There are means for directing polarized radiation of a second frequency range through the electro-optic medium, means for reflecting that polarized radiation back through the electro-optic medium, and means for detecting the modulation pattern of the polarized radiation imposed on the radiation by the birefringence of the electro-optic medium.

DISCLOSURE OF PREFERRED EMBODIMENTS

Other objects, features and advantages will occur from the following description of preferred embodiments and the accompanying drawings, in which.

Figure 1:
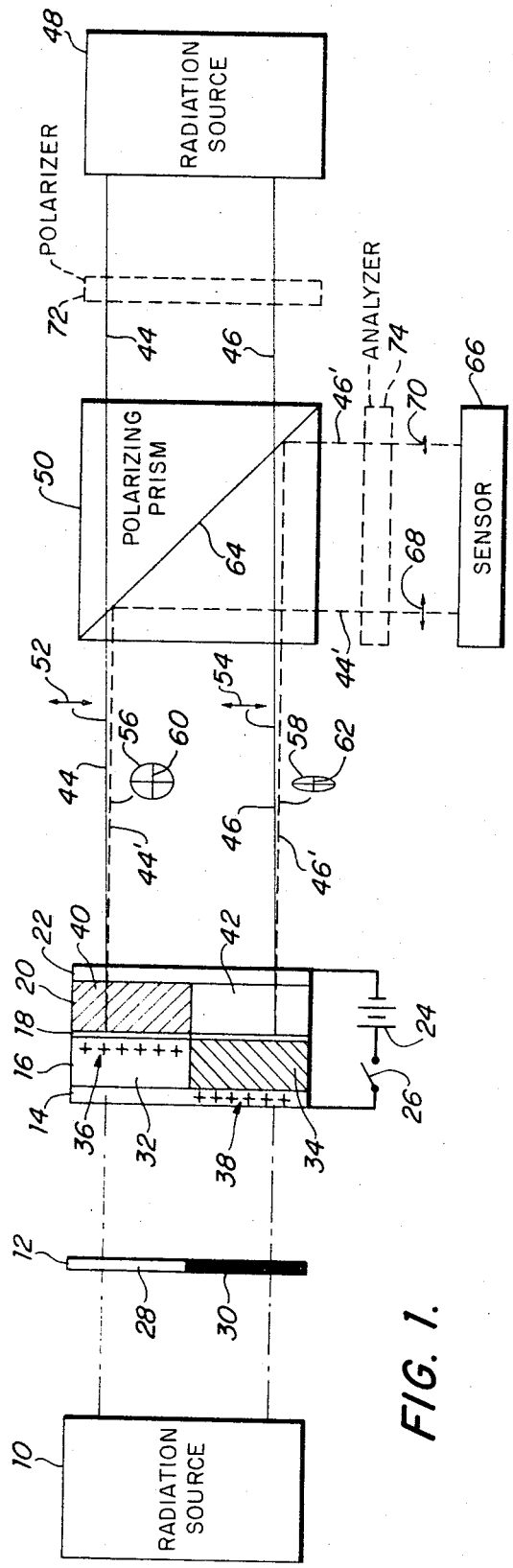
FIG. 1 is a diagram of an image converter apparatus which may be used to change the frequency of the radiation forming the image or to increase the brightness of the radiation forming the image, or both, using polarized radiation which is directed through and reflected back through an electro-optic birefringent medium according to this invention.

In one embodiment an electro-optic birefringent medium is subjected to an information bearing electric field, whose intensity varies in some predetermined pattern. Areas of the electro-optic birefringent medium proximate higher intensity portions of the electric field characteristically exhibit greater induced birefringence than those areas proximate lower intensity portions. Circular or plane polarized radiation submitted to the electro-optic birefringent medium becomes elliptically polarized to an extent dependent upon the birefringence of the area of the medium through which it passes. Thus radiation passing through areas of the electro-optic medium subject to high intensity portions of the electric field is more elliptically polarized than radiation passing through the areas subject to less intense portions of the electric field. The ellipticity of the radiation can be detected by using an analyzer, which, for example, has its polarization plane orthogonal to that of plane polarized input radiation. In that instance a greater cross component of radiation is detected in radiation from areas of the electro-optic medium subject to high electric field intensity and a lesser cross component is detected in radiation from areas subject to lower intensity radiation. This results in an image or pattern similar to the pattern of information represented by the electric field. If the polarizer is oriented parallel to the plane of polarization of the input radiation a negative of the electric field pattern results. According to this invention the polarized read out radiation is directed through and then reflected back through the electro-optic birefringent medium so that the affect of the electric field intensity on the birefringence of the medium is doubly applied to the read out radiation. The polarized read out radiation may be directed to the electro-optic medium through a beam splitter and then redirected to a sensor by the beam splitter after reflection back through the electro-optic medium.

The information bearing electric field may be associated with the electro-optic medium by means of a photoconductor medium associated with the electro-optic medium. A pair of electrodes are positioned with the mediums between them and a voltage is applied between the electrodes across the mediums. A radiant image incident on the photoconductor medium causes the photoconductor medium to become more conductive in areas where the image is brighter than in areas where the image is less bright. Charges on the electrode adjacent the photoconductive medium migrate farther, towards the electro-optic medium, in the higher conductance areas of the photoconductor medium than in the lower conductance areas. Thus the pattern of electric field intensity across the electro-optic medium is similar to the pattern or image of the radiation striking the photo-conductor medium and the birefringence of the electro-optic medium also varies in the same pattern. A discussion of one application of an electro-optic device is contained in an article in the *RCA Review*, December 1969, p. 567, A REFLEX ELECTRO-OPTIC LIGHT VALVE TELEVISION DISPLAY, by D.H. Pritchard.

The invention may be implemented, as shown in FIG. 1. A radiation source 10 irradiates information bearing transparency 12 so that the image of the information borne by transparency 12 is projected through electrode 14 onto the surface of photoconductor medium 16. A reflective dielectric layer 18 is positioned between photoconductor medium 16 and electro-optic medium 20 and the second electrode 22 is positioned adjacent electro-optic medium 20: battery 24 is connected across electrodes 14 and 22 by means of switch 26. The upper portion 28 of transparency 12 is less dense than the lower portion 30 so that the upper section 32 of photoconductor medium 16 becomes more conductive than the lower section 34. As a result, positive charges 36 migrate more easily from electrodes 14 through the more conductive section 32 than do the positive charges 38 through the less conductive section 34. Thus, the electric field intensity is greater across section 40 of electro-optic medium 20 than it is across section 42 and therefore the birefringence of section 40 is more pronounced than the birefringence of section 42.

Radiation 44, 46 from radiation source 48 passes through beam splitting polarizing prism 50 and becomes plane polarized as indicated by arrows 52, 54. After passing through prism 50, radiation 44, 46 passes through the transparent electrode 22 and through electro-optic medium 20 and strikes the reflective dielectric layer 18 from which it is reflected back through the electro-optic medium 20 and out through transparent electrode 22. As radiation 44, 46 passes through the electro-optic medium to reflected surface 18 and is reflected back from surface 18 through the electro-optic medium 20 it becomes elliptically polarized. Radiation 44 passing through section 40 of electro-optic medium 20 becomes more elliptically polarized, ellipse 56, than radiation 46 passing through section 42 of the electro-optic medium 20, ellipse 58, because the induced birefringence in section 40 is greater than that in section 42. Thus, the cross component 60 of the elliptically polarized reflected radiation 44' is greater than the cross component 62 of the elliptically polarized reflected radiation 46'.

Radiation 44', 46' is reflected from boundary 64 of prism 50 to sensor 66. Polarizing prism 50 functions as an analyzer to detect the cross component of the elliptically polarized radiation so that only plane polarized radiation reaches sensor 66 and that plane polarized radiation, arrows 68, 70, is plane polarized orthogonal to the plane of polarization of radiation 44, 46, indicated by arrows 52, 54. If it is desired to use a beam splitting device which is not also a polarizing prism, a polarizer element 72 may be used to polarize radiation 44, 46 or radiation source 48 may itself be a source of polarized radiation. Similarly, a polarizer 74 may be used as an analyzer to detect the cross component or any other desired component of the elliptically polarized radiation prior to its submission to sensor 66. Sensor 66 may be a photoelectric cell or cells or any other device suitable for converting optical signals into electrical signals.

In FIG. 1 the radiation from radiation source 10 may be of any frequency to which the photoconductor medium 16 is responsive. Similarly, the radiation 44, 46 from radiation source 48 may be any desired frequency because there is no optical interaction between the read in and read out operations. The frequencies of the read in and read out radiation are independent of each other. In addition, since there is no phosphor screen or similar device required to produce the read out image the brightness of the read out image is directly related to the brightness of the radiation 44, 46 supplied by radiation source 48 and not limited by the properties of a phosphor. The brightness of the image presented at sensor 66 may be increased by simply increasing the brightness of the radiation supplied by radiation source 48. The arrangement in FIG. 1 whereby the read out radiation twice passes through the electro-optic medium 20 substantially increases the modulation of the polarized radiation imposed by the birefringence of the electro-optic medium 20 in the pattern representative of the information contained on the transparency 12.

Although the entire image of transparency 12 is projected onto photoconductor medium 16 at one time and the electro-optic medium 20 is fully irradiated by radiation source 48, this is not a limitation of the invention, for either the read in radiation from radiation source 10 or the read out radiation from radiation source 48 may be supplied serially by means of a scanning beam. Further, although the read out radiation submitted to the electro-optic medium 20 is plane polarized, it may as well be circularly polarized. The photoconductor medium may be a layer of gallium arsenide or silicon and the electro-optic medium may be a layer of potassium dihydrogen-phosphate (KDP).

Figure 2:
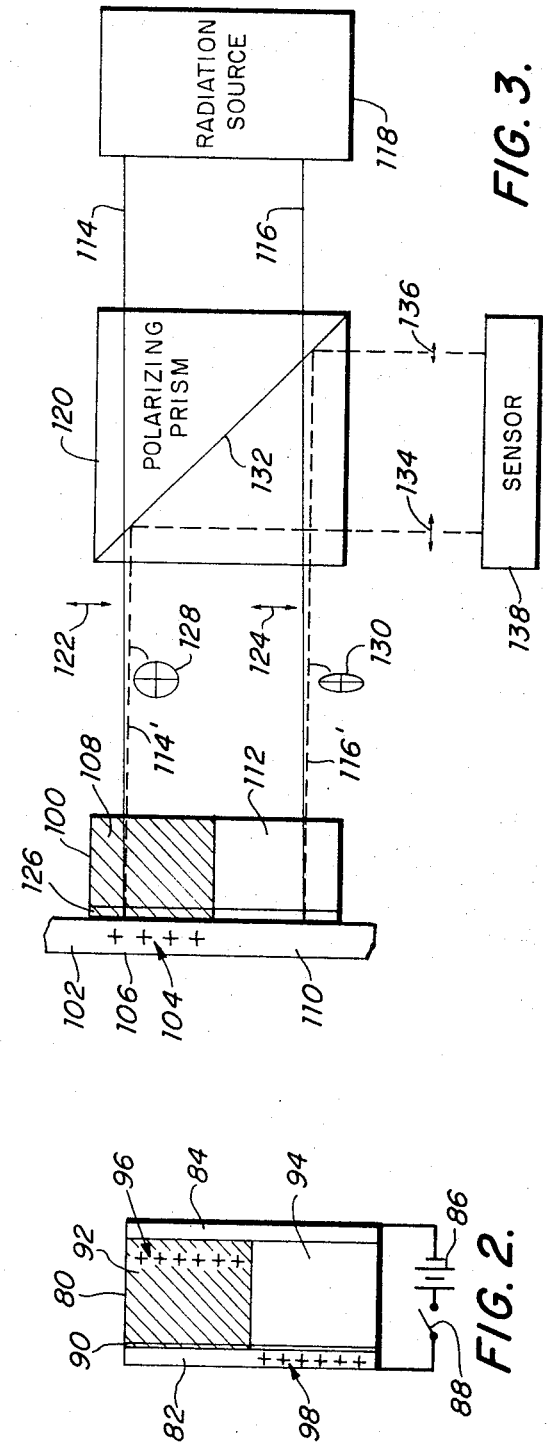
FIG. 2 is a diagram of an alternative electro-optic device usable in the apparatus of FIG. 1 in which the electro-optic birefringent medium and photoconductor medium are embodied in the same material.

Alternatively, the photoconductive medium and electro-optic medium may be contained in a single material such as cubic zinc sulfide, zinc selenide, or zinc telluride. Such a device is shown in FIG. 2 where the electro-optic photoconductive medium 80 is placed between a pair of electrodes 82, 84 energized by battery 86 through switch 88. A metal or other conductive reflecting surface 90 may be placed between electrode 82 and layer 80. With the device of FIG. 2 the read in radiation and the polarized read out radiation must both pass through electrode 84 so that the polarized read out radiation must be of a frequency to which the photoconductor medium contained in layer 80 is not responsive. The polarized read out radiation passes through electrode 84 through layer 80 and is reflected back through layer 80 and electrode 84 from reflecting surface 90 and is detected and sensed in the same manner as discussed with reference to FIG. 1. The device of FIG. 2 used with the apparatus of FIG. 1 causes the upper section 92 of layer 80 to become more conductive than the lower section 94 because upper section 92 is subjected to the brighter radiation passing through the upper portion 28 of transparency 12 while section 94 of layer 80 is subjected to the lower intensity radiation passing through the higher density portion 30 of transparency 12. Thus, the positive charges 96 migrate more easily through upper section 92 than do the positive charges 98 through lower section 94. As a result, the intensity of the electric field is greater across section 94 than it is across section 92. Therefore, the induced birefringence of section 94 is greater than the induced birefringence of 96. With the device of FIG. 2, the areas of layer 80 struck by the higher intensity input radiation produce less elliptically polarized radiation and the areas of layer 80 struck by the lower intensity input radiation produce the more elliptically polarized output radiation. Conversely, as indicated in FIG. 1 where two separate layers 16 and 20 are used to embody the photoconductor medium and electro-optic medium, respectively, the areas struck by the higher intensity input radiation produce the more elliptically polarized output radiation and the areas struck by the lower intensity input radiation produce the less elliptically polarized output radiation.

Figure 3:
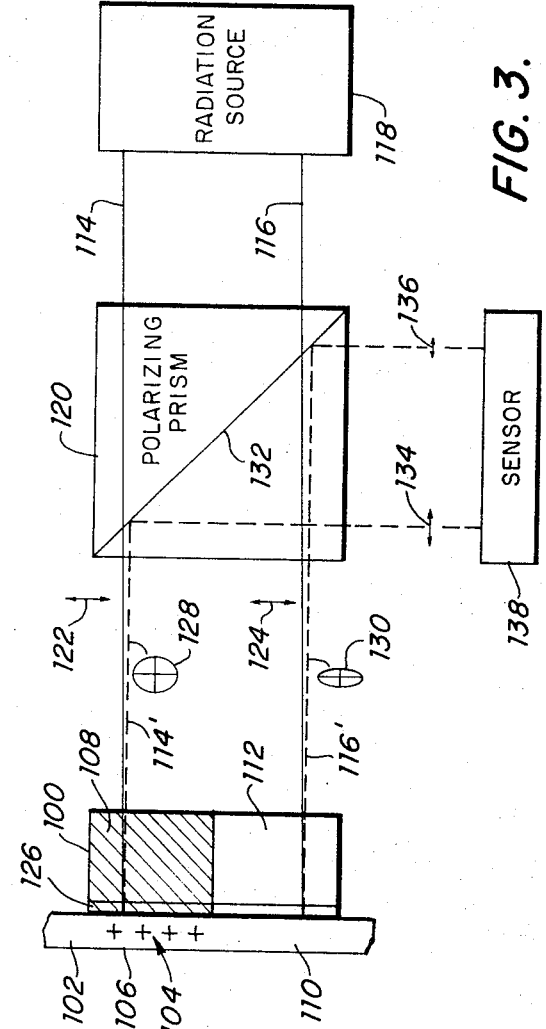
FIG. 3 is a diagram of an electro-optic birefringent medium used in a more general read out apparatus according to this invention.

Although the technique of this invention has thus far been shown embodied in image converter and intensifier apparatus, it may be used in wide variety of other applications to read out any information present in the form of variations in the intensity of an electric field. Thus, for example, there is shown in FIG. 3 an electro-optic medium, layer 100, which is used to read out the electric field stored on, for example, a dielectric storage tape 102. The positive charge 104 present in the upper portion 106 of tape 102 causes a greater induced birefringence in the upper section 108 of layer 100 than is present in the lower section 112 of layer 100 which is adjacent lower portion 110 of layer 100 which is adjacent the chargeless lower portion of tape 102.

Read out of the information on tape 102 is accomplished by means of electro-optic layer 100 in the same manner as explained with reference to FIG. 1. Radiation 114, 116 from radiation source 118 is plane polarized by polarizing prism 120 as indicated by arrows 122, 124 and passes through electro-optic layer 100 to strike the dielectric reflective layer 126. From dielectric reflective layer 126 the reflected radiation 114', 116' now elliptically polarized as indicated by ellipses 128, 130 strikes boundary 132 of prism 120. Polarizing prism 120 transmits in this direction radiation polarized in the plane orthogonal to that indicated by arrows 122, 124 so that the cross components 134, 136 of the elliptically polarized radiation 128 are detected and presented to sensor 138. This technique may also be used to read out information present in electric fields which are presented in a serial fashion such as by a scanning electron beam or a similar device.

Other embodiments will occur to those skilled in the art and are within the following claims:

What is claimed is:

1. Image converter apparatus for receiving information contained in a pattern of radiation in a first frequency range and converting it to a similar pattern of radiation in a second frequency range comprising:

a combined photoconductor and electro-optic medium, embodied in a single layer of material so that its conductivity changes under illumination with actinic radiation and its birefringence varies as a function of the intensity of an applied electric field thereacross;

means for providing a pattern of information in a first frequency range to said photoconductor and electro-optic medium;

means for applying an electric field across said photoconductor and electro-optic medium;

means for directing polarized radiation of a second frequency range through said electro-optic medium;

means for reflecting said polarized radiation back through said electro-optic medium; and means for detecting the modulation pattern of said polarized radiation imposed by the birefringence of said electro-optic medium.

2. The image converter apparatus of claim 1 in which said means for providing a pattern of information in a first frequency range includes a first radiation source.

3. The image converter apparatus of claim 2 in which said means for applying includes a pair of electrodes, one on said side of said photoconductor and electro-optic layer, and means for supplying a voltage across the electrodes.

4. The image converter apparatus of claim 1 in which said means for directing includes a second polarized radiation source.

5. The image converter apparatus of claim 4 in which said polarized radiation source includes a polarizing element.

6. The image converter apparatus of claim 1 in which said means for directing includes a beam splitting member for passing polarized radiation from said polarized radiation source to said electro-optic medium and for passing radiation from said electro-optic medium to said means for detecting.

7. The image converter apparatus of claim 1 in which said means for reflecting includes a metal surface at one surface of said electro-optic layer medium.

8. The image converter apparatus of claim 1 in which said means for detecting includes a crossed polarizer.

9. The image converter apparatus of claim 6 in which said beam splitting member is a polarizing device oriented to perform as a crossed polarizer and function as said means for detecting.

10. The image converter apparatus of claim 1 further including sensor means responsive to said means for detecting.

* * * * *